United States Patent [19]

Shekhawat et al.

[11] Patent Number: 4,635,177
[45] Date of Patent: Jan. 6, 1987

[54] CONTROL FOR A NEUTRAL POINT CLAMPED PWM INVERTER

[75] Inventors: Sampat S. Shekhawat; P. John Dhyanchand; Pierre Thollot, all of Rockford, Ill.

[73] Assignee: Sundstrand Corporation, Rockford, Ill.

[21] Appl. No.: 672,305

[22] Filed: Nov. 16, 1984

[51] Int. Cl.[4] .......................... H02M 1/12; H02M 1/14
[52] U.S. Cl. ......................................... 363/41; 363/98; 363/132
[58] Field of Search ............................. 363/41, 98, 132

[56] References Cited

U.S. PATENT DOCUMENTS

| | | | |
|---|---|---|---|
| 3,286,155 | 11/1966 | Corey . | |
| 4,086,623 | 4/1978 | Jensen | 363/41 |
| 4,348,734 | 9/1982 | Dougherty | 363/41 X |
| 4,443,841 | 4/1984 | Mikami et al. | 363/41 |
| 4,466,070 | 8/1984 | Claussen | 364/480 |
| 4,507,724 | 3/1985 | Glennon | 363/98 |
| 4,520,437 | 5/1985 | Boettcher, Jr. et al. | 363/41 |

OTHER PUBLICATIONS

"A New Neutral-Point-Clamped PWM Inverter" by Nabae et al., *IEEE Transactions on Industry Applications*, vol. 1A-17, No. 5, Sep./Oct., 1981, pp. 518-523.
"New Format Step-wave Inverter", by Naniwae from the 1980 National Meeting of Denki Gakkai and translation.
"A New Neutral-Point-Clamped PWM Inverter" by Nabae et al, copyright 1980, IEEE, pp. 761-766 from IAS Annual Meeting.

*Primary Examiner*—Patrick R. Salce
*Assistant Examiner*—Marc S. Hoff
*Attorney, Agent, or Firm*—Wood, Dalton, Phillips, Mason & Rowe

[57] ABSTRACT

Prior types of neutral point clamped PWM inverters have included memories for storing a plurality of PWM waveforms, one of which is utilized to control switches in the inverter to maintain an output parameter within prescribed limits. Such types of inverter controls, however, cannot provide the necessary degree of regulation in some applications. To overcome this problem, an inverter control according to the present invention permits on-line generation of PWM patterns for a neutral point clamped PWM inverter. The control includes circuitry for generating a depth of modulation signal representing the deviation of the output of the inverter from a desired level. A microprocessor and memory are coupled to the generating circuitry for calculating switching points for the inverter switches during operation of the inverter based upon the depth of modulation signal for a given number of pulses to be produced during each half cycle of the output. Timer modules are coupled to the microprocessor for developing switch control signals for each switch from the switching points so that the switches are operated to reduce the deviation of the output from the desired level.

16 Claims, 7 Drawing Figures

CONTROL FOR A NEUTRAL POINT CLAMPED PWM INVERTER

BACKGROUND ART

The present invention relates generally to inverter controls, and more particularly to a control for operating switches in a pulse width modulated inverter to minimize harmonics in the output thereof.

Prior conventional inverters typically include one or more legs, each of which includes a pair of switches connected in series across a DC power source developing first and second voltages. The switches are operated to develop a phase output at a junction therebetween. In such an inverter, each phase output is switched between the first and second voltages developed by the DC power source. This wide swing in output voltage results in an undesirably high harmonic content in the output.

In an attempt to reduce this harmonic content, neutral point clamped inverters have been developed which limit the output voltage swing. Such inverters include a pair of clamping switches coupled between each phase output and a neutral voltage, with the clamping switches being operated by logic in interlocking fashion with the main phase switches in the inverter leg so that the output voltage swing is limited to half the voltage produced by the DC power source. An example of such an inverter system is disclosed in an article entitled "A New Neutral-Point-Clamped PWM Inverter", by Nabae et al., *IEEE Transactions on Industry Applications*, Vol. 1A-17, No. 5, September/October, 1981, PP 518-523.

The above-referenced article appears to suggest that a memory may be utilized to store a number of pulse width modulated (PWM) switching patterns, with the switches in the inverter being controlled in accordance with a pattern which is selected from the memory based upon an output parameter.

The chief disadvantage of this approach is that output regulation is accomplished in discrete steps, i.e. there is only a discrete number of PWM patterns which are available to control the inverter switches. The occasion may arise where optimal control of the inverter output can be obtained only by use of a PWM pattern not stored in the memory. In such a case, a PWM pattern which is stored in the memory must be used to control the switches, which pattern may not result in adequate control over the inverter output.

This discrete regulation typically means that a large memory must be used to store a large number of PWM patterns to maintain output regulation within acceptable limits under dynamic conditions or that the inverter system be limited to use in applications in which output regulation is not critical.

Further, the above system generates waveforms of differing harmonic content. This variation in harmonic content requires that the output filter with which the inverter is used be sized to accommodate worst case conditions. A consequence of this is that the harmonic content in the output as measured over the total operating range of the inverter is not minimized.

DISCLOSURE OF INVENTION

In accordance with the present invention, a control for a neutral point clamped PWM inverter effects on-line computation of switching points for switches in the inverter so that memory size can be reduced.

The control includes means for generating a depth of modulation signal representing the deviation of the inverter output from a desired level. Means are coupled to the generating means for calculating switching points for switches in the inverter as the inverter is operating based upon the depth of modulation signal for a given number of pulses to be produced during each half cycle of the inverter output. Means are coupled to the calculating means for developing switch control signals for each switch from the switching points so that the switches are operated to reduce the deviation of the output from the desired level.

The control requires relatively little memory in order to calculate the switching points and to generate the switch control signals. Furthermore, the on-line calculation of the switching points results in a continuous regulation scheme so that dynamic regulation is improved and the harmonic content in the inverter output over the operating life of the inverter is reduced.

Alternatively, the memory can be loaded with values which permit the inverter to produce a variable number of pulses per half-cycle and/or to be operated at varying frequencies. Thus, a single control can be utilized in any one of a variety of applications, and not just one for which the control has been specially programmed.

BEST MODE FOR CARRYING OUT THE INVENTION

Figure 1:
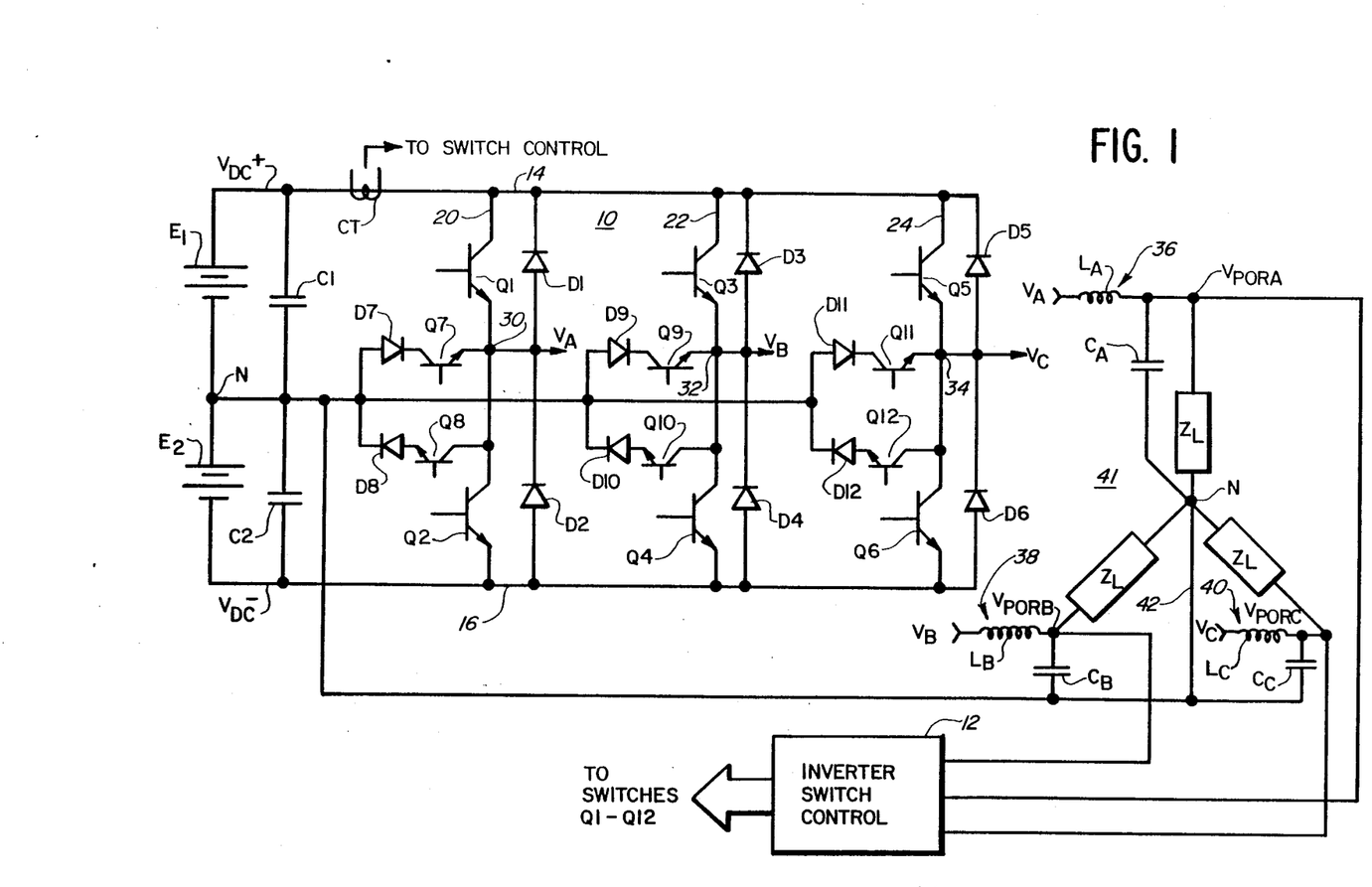
FIG. 1 is a combined simplified schematic and block diagram of a neutral point clamped inverter in conjunction with the control of the present invention.

Referring now to FIG. 1, there is illustrated one type of neutral point clamped inverter 10 in conjunction with an inverter switch control 12 according to the present invention. The inverter 10 includes first and second rails 14, 16 which receive DC voltages $V_{DC}^+$ and $V_{DC}^-$ developed by a pair of DC voltage sources $E_1$ and $E_2$. Coupled across the rails 14, 16 are three inverter legs 20, 22, and 24, each comprising a pair of series connected phase output switches Q1, Q2 and Q3, Q4 and Q5, Q6, respectively. Connected across the collector and emitter electrodes of each of the switches Q1-Q6 is a flyback diode D1-D6, respectively. These diodes prevent reverse breakdown of the switches Q1-Q6.

Also coupled across the rails 14, 16 is a pair of capacitors C1 and C2 which minimize disturbances caused by regenerative currents.

The switches Q1-Q6 are operated so that phase outputs $V_A$, $V_B$, $V_C$ are developed at junctions 30, 32, 34 between switches of each leg 20, 22, 24, respectively.

Each of the junctions 30, 32 and 34 is coupled by a pair of clamping switches to a neutral line N connected to the junction between the voltage sources E₁ and E₂. For example, referring specifically to the inverter leg 20, the junction 30 is coupled by means of diodes D7 and D8 and switches Q7 and Q8 to the neutral line N. Similarly, the junction 32 is connected to the neutral line N by means of diodes D9 and D10 and switches Q9 and Q10 as is the junction 34 by diodes D11 and D12 and switches Q11 and Q12.

While the switches Q1–Q12 are illustrated as bipolar transistors, it should be understood that these switches may be other types of devices, if desired.

As noted more specifically below, the phase output switches Q1–Q6 of each leg are operated in interlocking fashion with the clamping switches Q7–Q12 associated with that leg to limit the voltage swing at the respective phase output to one-half the voltage difference between the rails 14, 16.

Each of the phase outputs $V_A$, $V_B$, and $V_C$ is coupled through an output filter 36, 38, 40, respectively, to individual phases of a load 41 represented by phase impedances $Z_L$. While each output filter is represented in FIG. 1 by lumped impedances, such as $L_A$ and $C_A$ in filter 36, it should be understood that these lumped impedances may represent the combined effect of several inductors and capacitors. Also, the phase impedances of the load 41 may be unequal, causing an unbalanced load condition.

Each of the phases of the load 41 is connected to the neutral line by a conductor 42. This type of inverter, therefore, comprises a three phase - four wire system.

The switches Q1–Q12 in the inverter 10 are operated by the switch control 12 which senses the voltage at a point of regulation, or POR, near the load. The switch control 12 also receives a signal representing the current in one of the rails 14, 16 from a current transformer CT. This signal is utilized to limit the destructive effects of shoot-through or cross conduction of transistors in the inverter legs.

Figure 2:
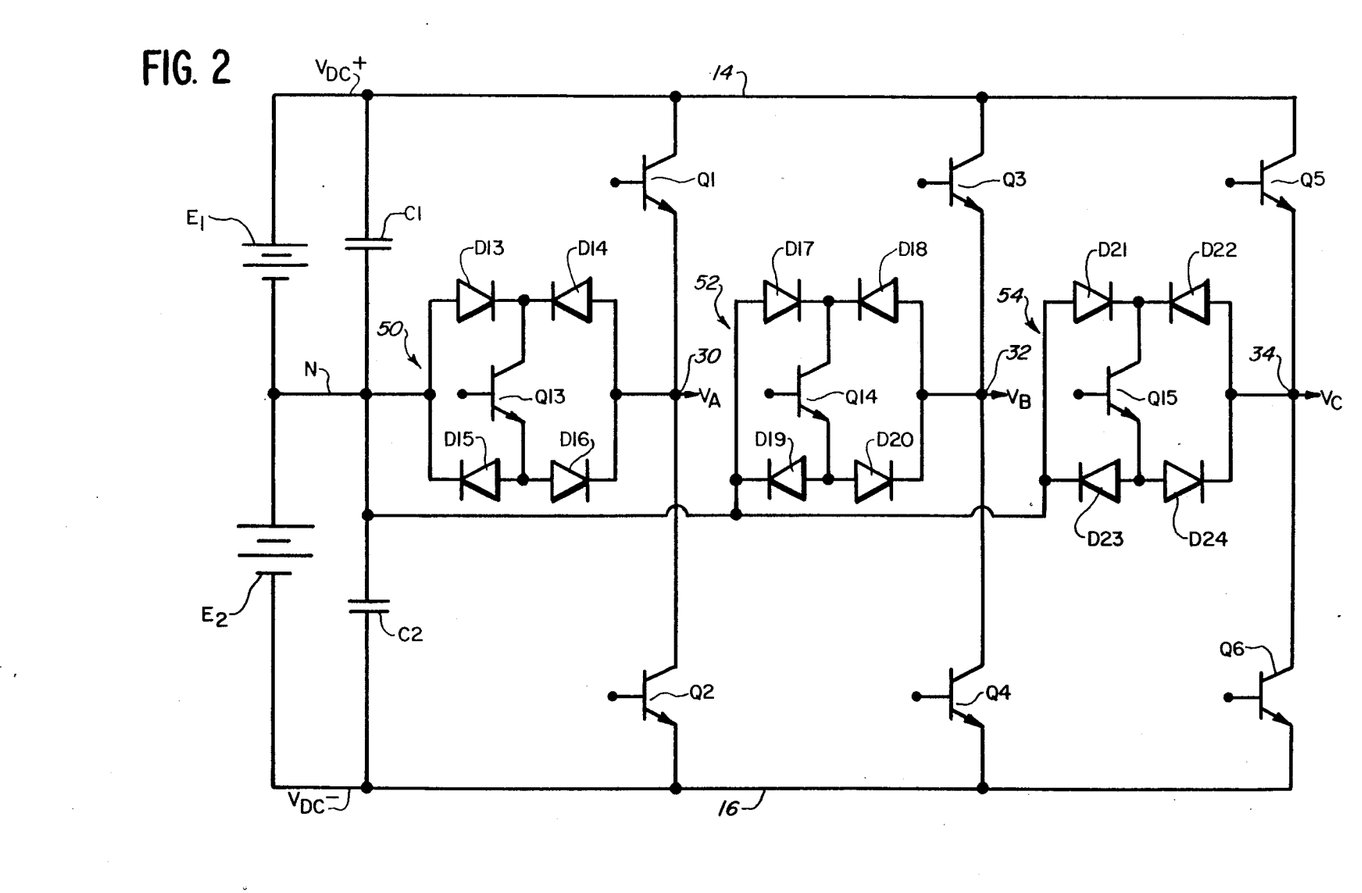
FIG. 2 is a simplified schematic diagram of a different type of clamped inverter with which the control of the present invention may be used.

The neutral point clamped topology shown in FIG. 1 can alternatively be replaced by that shown in FIG. 2, in which like reference numbers or letters designate elements in common with FIG. 1. Several of the elements which would normally be present in FIG. 2, such as the flyback diodes and the load and associated circuits are not shown for purposes of clarity.

Each of the junctions 30, 32, 34 is coupled by means of a bilateral switch 50, 52, 54, respectively, to the neutral line N. Each bilateral switch, such as the switch 50, includes four diodes D13–D16 which are connected in a bridge configuration. One pair of diagonally opposite vertices of the bridge is connected across the phase output and the neutral line N while the collector and emitter electrodes of a switch Q13 are connected across the other pair of vertices.

The operation of the inverter of FIG. 2 differs from that shown in FIG. 1 in that each switch Q13–Q15 is operated when both of the transistors of the associated inverter leg are in an off state. This function is described with more particularity below.

A more specific description of the bilateral switch is contained in Glennon, U.S. Ser. No. 531,037, filed Sept. 12, 1983, entitled, "Improved Waveform Inverter", and assigned to the assignee of the instant application, the disclosure of which is hereby incorporated by reference.

Referring again to FIG. 1, the control of the present invention is a microprocessor-based system which develops PWM waveform patterns on-line, i.e. the PWM patterns are generated as the inverter is operating based upon one or more operating parameters of the inverter, such as the POR voltage and/or DC link current in the rails 14, 16. The microprocessor in the switch control 12 utilizes a pair of equations to calculate switching points for the PWM patterns as follows $$\alpha_{RN} = \alpha_{REFN} - \beta_{1N}$$

$$\alpha_{FN} = \alpha_{REFN} + \beta_{2N}$$

Figure 3:
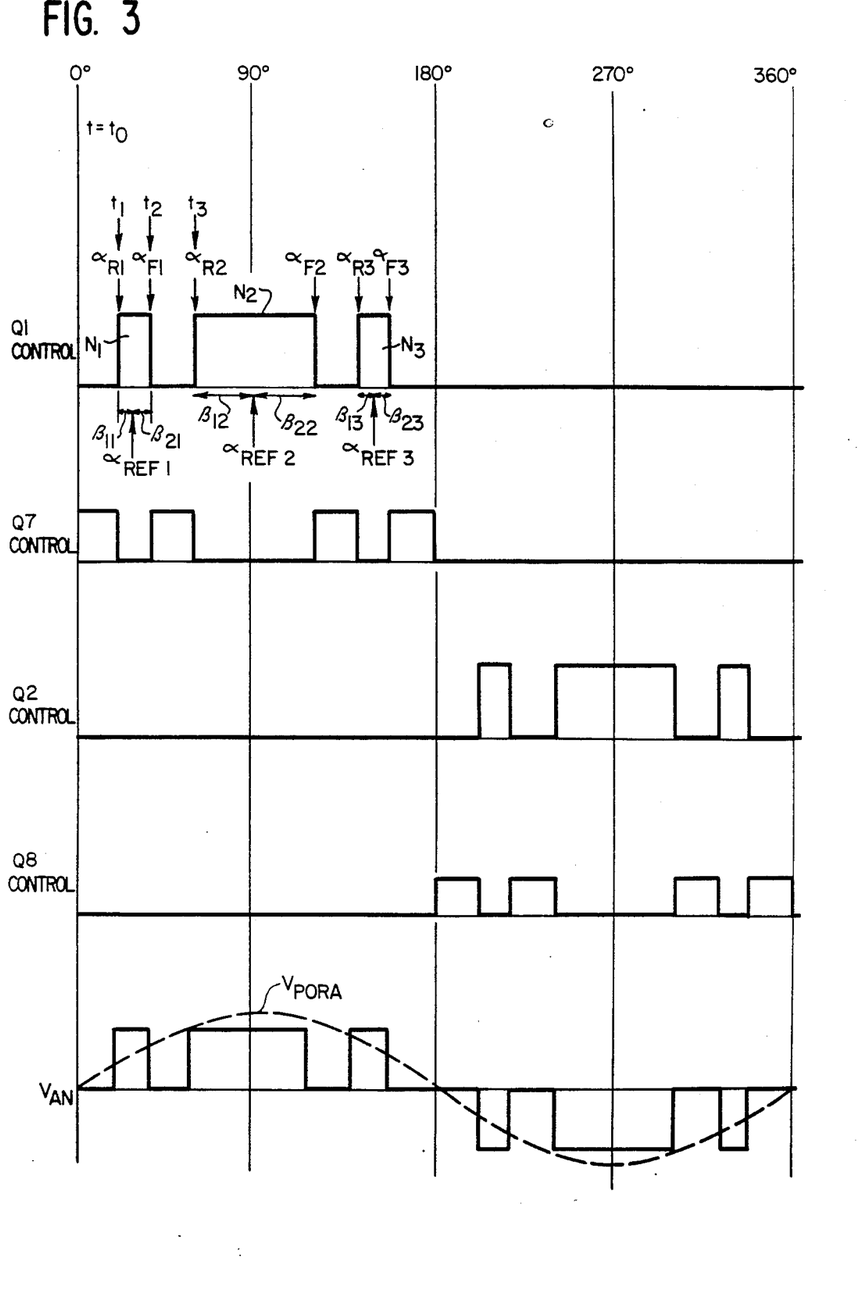
FIG. 3 is a series of waveform diagrams illustrating the operation of the control shown in FIG. 1.

The above terms $\alpha_{RN}$ and $\alpha_{FN}$ represent the rising and falling edges, respectively, of pulses in a pulse width modulation pattern. FIG. 3 illustrates the case where the number of pulses P to be produced per half cycle is equal to three. The switching points for each pulse in the PWM pattern are determined by finding a reference point for the pulse represented by the term $\alpha_{REFN}$, and subtracting from this term the value $\beta_{1N}$ to derive $\alpha_{RN}$ and adding to this term the value $\beta_{2N}$ to derive $\alpha_{FN}$. For example, as seen in the waveform of FIG. 3 representing the drive for the switch Q1, a pulse N is defined by switching points found by subtracting the value $\beta_{11}$ from the term $\alpha_{REF1}$ and adding a value $\beta_{21}$ to the term $\alpha_{REF1}$.

The terms $\alpha_{REFN}$, $\beta_{1N}$, and $\beta_{2N}$ are defined as follows:

$$\alpha_{REFN} = \frac{90}{FP}(2N - 1) \tag{3}$$

$$\beta_{1N} = \frac{180}{\pi F} DM \int_{\frac{90}{P}(2N-2)}^{\frac{90}{P}(2N-1)} \sin\theta \, d\theta \tag{4}$$

$$\beta_{2N} = \frac{180}{\pi F} DM \int_{\frac{90}{P}(2N-1)}^{\frac{90}{P}(2N)} \sin\theta \, d\theta \tag{5}$$

where:
F is the desired frequency of the inverter output;
P is the number of pulses developed at each phase output during a half-cycle;
N is the number of a pulse in a quarter-cycle, where $1 \leq N \leq (P+1)/2$; and
DM is a term representing "depth of modulation", this term being proportional to the deviation of a POR phase voltage from a desired level.

The only variables in the above equations (3)–(5) are the terms F, i.e. the desired output frequency, and DM which is a function of the output voltage of the inverter. Of course, when the inverter is to be operated as a constant frequency power supply, F is a known quantity and hence the only variable is DM. Of significance is the fact that, even when F is a variable, each of the integral terms in equations (4) and (5) reduces to a constant value once P has been determined since the limits on each integration are in degrees. Hence, each of equations (1) and (2) can be solved by simply inserting the current value of the variable DM in the equations along with the constant values and solving the equations (1) and (2) for each value of N.

Figure 4:
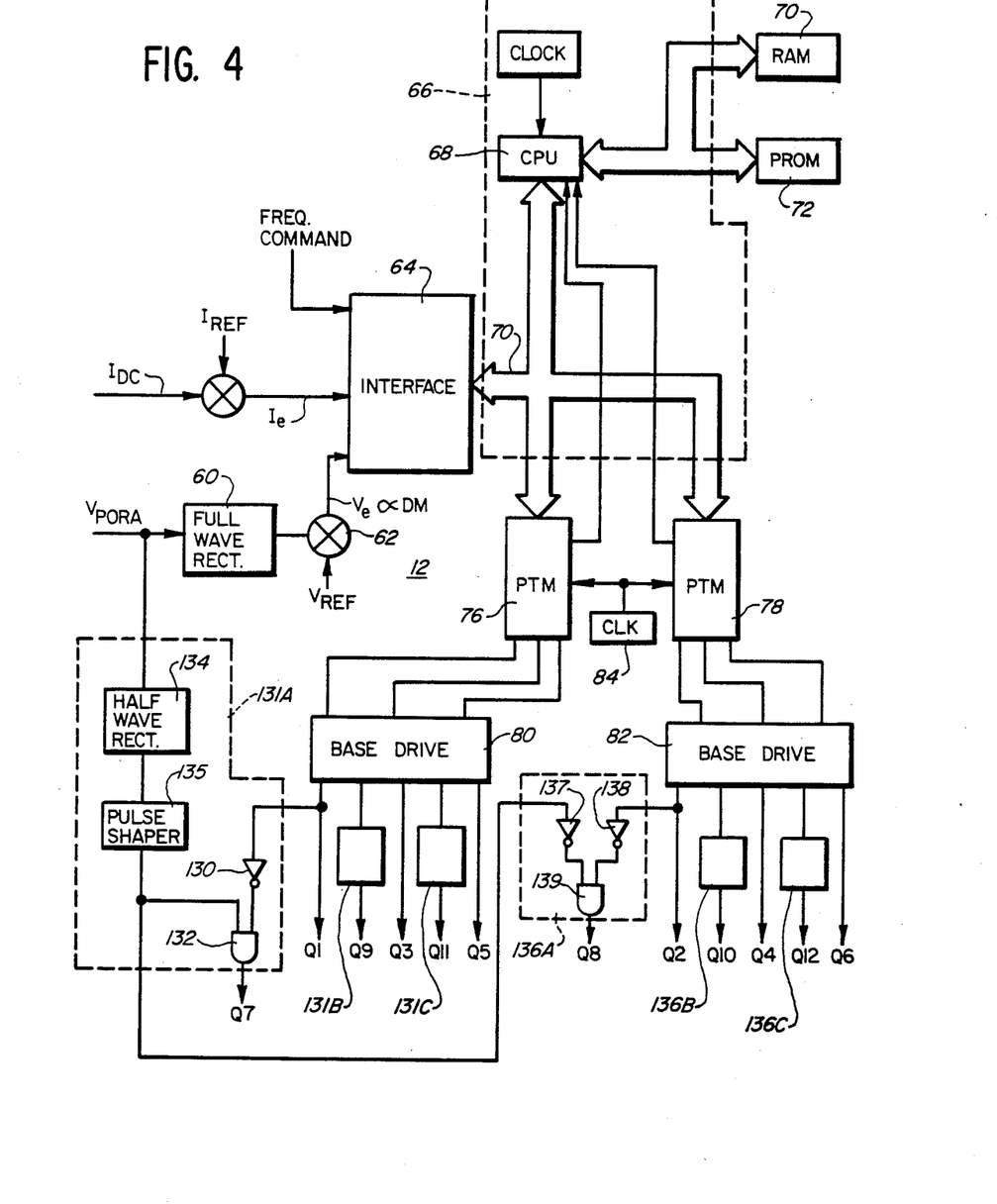
FIG. 4 is a block diagram of the control shown in FIG. 1.

Referring now to FIG. 4, there is illustrated in greater detail the switch control 12 shown in FIG. 1. The switch control 12 includes means for developing a signal representing the deviation of an operating parameter of the inverter from a desired value. The developing means includes a full-wave rectifier 60 which receives a POR voltage, such as $V_{PORA}$, and a controller 62 which subtracts a signal $V_{REF}$ representing the desired output voltage from the output of the rectifier 60 to develop an error signal $V_e$ which is proportional to the variable DM.

While not illustrated in FIG. 4, each of the POR voltages $V_{PORB}$ and $V_{PORC}$ may be rectified and compared to reference signals by circuits similar to circuits 60, 62 to develop additional error signals which are proportional to the variable DM for each of these phases. These signals may be used to calculate switching points for the switches of these phases so that individual phase regulation can be accomplished, if desired.

The error signal $V_e$ is coupled to an interface unit 64 which converts the signal into data signals which are then coupled to a microprocessor 66.

The interface unit 64 also receives a current error signal $I_e$ which is developed by coupling a signal $I_{DC}$ representing the current in one of the rails 14, 16 to a controller which subtracts from this signal a reference $I_{Ref}$. A frequency command signal may also be coupled to the interface unit 64 in the event that the inverter is to be used as a variable frequency power supply.

The interface unit 64 is coupled to a CPU 68 within the microprocessor 66 over a data bus 70. The CPU is in turn coupled to a pair of memory units consisting of a random access memory, or RAM 70 and a programmable read only memory, or PROM 72. These memory units may be a part of the microprocessor 66 or may be external units, as desired.

Figure 5:
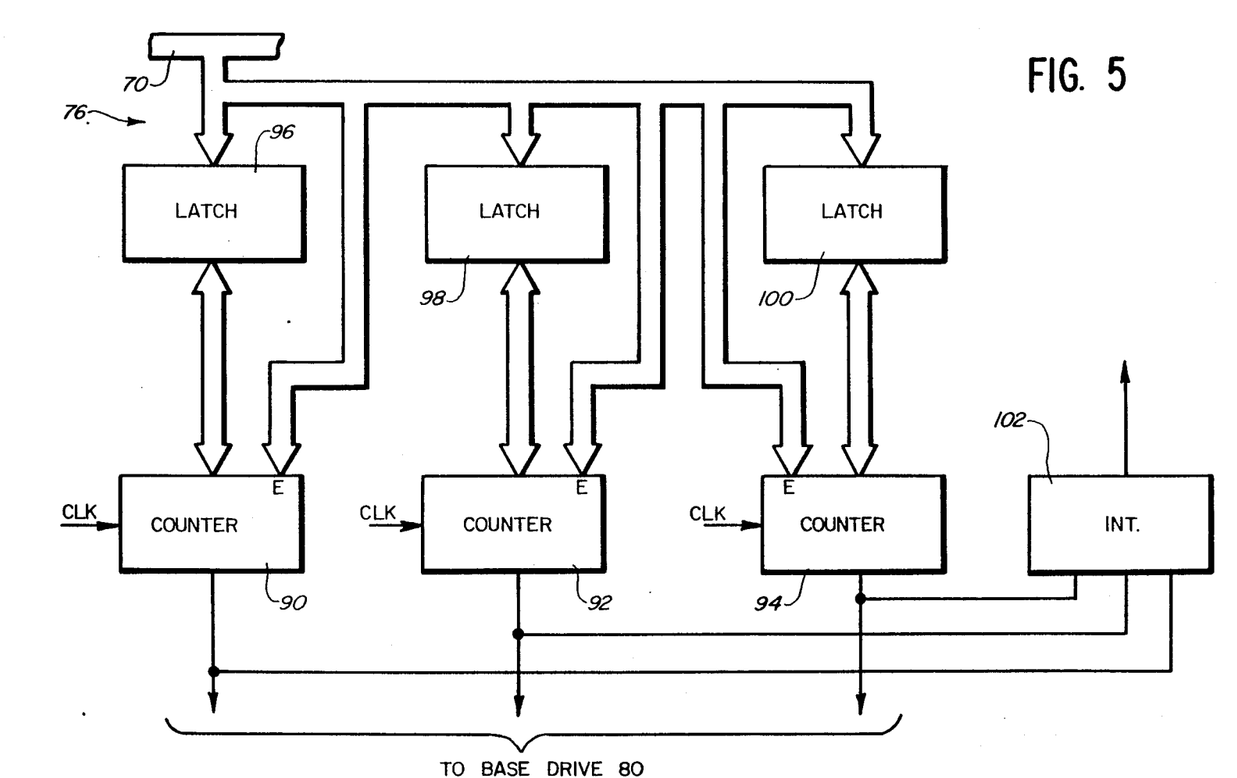
FIG. 5 is a block diagram of one of the programable timer modules (PTM) shown in FIG. 4.

The microprocessor data bus 70 is also coupled to a pair of programmable timer modules 76, 78 each of which in turn develops signals for controlling the conduction of one-half of the switches Q1–Q12 through base drive circuits 80, 82, respectively. Each of the programmable timer modules 76, 78 receives clock signals from a clock 84. As seen in FIG. 5, and with reference to the PTM 76 specifically, the clock signal developed by the clock 84 is coupled to each of three counters 90, 92 and 94 which receive data signals on the bus 70 through latch circuits 96, 98 and 100, respectively. The output of the counters 90, 94 are coupled to the base drive circuit 80 and to an interrupt generator 102, which is in turn coupled to the CPU 68.

Figures 6, 7:
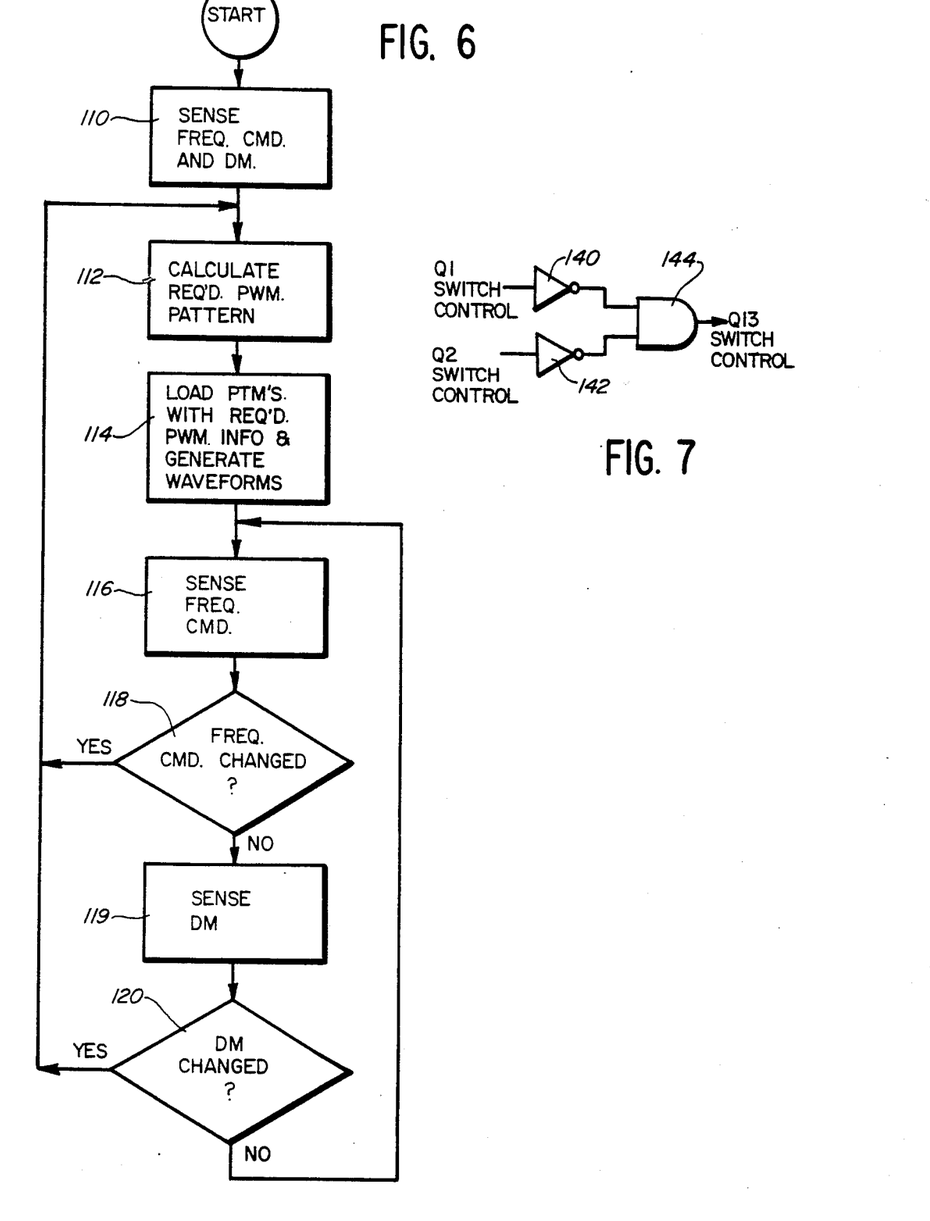
FIG. 6 is a flow chart illustrating the operation of the control shown in FIG. 1.
FIG. 7 is a schematic diagram of a circuit for developing a switch control signal for the switch Q13 shown in FIG. 2.

Referring also to FIG. 6, the control 12 according to the present invention is prepared for use by first determining the number of pulses P to be produced during each half cycle of the inverter output. While the example shown in FIG. 3 is for the case P=3, a greater number of pulses may alternatively be produced, as desired. In general, considerations of harmonic content in the output dictate that the number of pulses P to be produced during each half cycle be an odd multiple of three, i.e. 3, 9, 15, etc.

As previously mentioned, once P has been determined, the only variables remaining in equations (3)–(5) are the desired output frequency F and the variable DM. The integral terms in equations (4) and (5) are precalculated and these terms, as well as the remaining constants, are stored in memory locations in the PROM 72.

Referring now to FIG. 6, once the PROM 72 has been loaded with the control program for the microprocessor 66 and the terms and constants described above, and following start up of the inverter, a block 110 senses the frequency command and the signal $V_e$ representing the variable DM coupled to the bus 70 via the interface 64. A pair of blocks 112 and 114, to be described in greater detail below, then calculate the switching points for the required PWM pattern and operate the switches to generate the pattern.

Following the block 114, a block 116 again senses the frequency command and a block 118 then determines whether the frequency command has changed from the previous value. If this is not the case, control passes to a block 119 which senses the variable DM. If this variable has not changed since it was last sensed, control returns to the block 116, since the inverter output voltage is such that corrective action need not be taken.

Control remains in the loop consisting of the blocks 116–120 until a change in frequency command or a change in the variable DM occurs.

If either of the blocks 118 or 120 determines that there is a change in the frequency command or in the variable DM, control returns to the block 112 which calculates the PWM pattern required to maintain the inverter output at the desired voltage and/or frequency. This is accomplished by solving the equations (1)–(5) described above using the present values of the variables F and DM. The CPU 68 calculates the switching points for the PWM pattern for one quadrant of the desired output and stores values in the RAM 70 representing the distance or duration between the switching points. For example, with particular reference to FIG. 3, the CPU 68 stores values in the RAM 70 representing the duration between 0° and $\alpha_{R1}$, the duration between the switching points $\alpha_{R1}$ and $\alpha_{F1}$, and the duration between the switching points $\alpha_{F1}$ and $\alpha_{R2}$.

The CPU 68 also stores a value in the RAM 70 representing the deviation between the switching point $\alpha_{R2}$ and the 90° point multiplied by two. This value is used to generate the center pulse in each half-cycle.

Once these values have been stored in the RAM 70, the block 114, FIG. 6, loads the PTM's with the information representing the PWM pattern. This is accomplished by loading each of the latches in the PTM's with the required values, and enabling the counters by coupling an enable signal to an enable input E at appropriate times so that the proper phase sequence is produced. Taking the waveform of FIG. 3 as an example, the value representing the duration between the 0° point of the output waveform and the switching point $\alpha_{R1}$ is loaded into the latch 96 at a point prior to time $t_o$. At time $t_o$, the counter 90 is enabled by a signal from the CPU 68 to begin decrementing the value stored in the latch 96 as pulses are received from the clock 84. Also at this time, the latch input receives a next value representing the duration between the switching points $\alpha_{R1}$ and $\alpha_{F1}$.

At time $t_1$ the counter 90 has decremented the present value representing the duration between the 0° point and the switching point $\alpha_{R1}$ to zero. The output of the counter 90 then switches to a high state. This high state signal is coupled through the base drive circuit 80 to the control input of the switch Q1 so that this switch is closed. The high state signal from the counter 90 is also coupled to the interrupt circuit 102 which in turn causes the CPU to load the next value representing the duration between switching points $\alpha_{F1}$ and $\alpha_{R2}$ into the latch 96. Also at time $t_1$, the counter 90 is enabled to decrement the value representing the duration between the switching points $\alpha_{R1}$ and $\alpha_{F1}$.

Once the counter 90 has decremented this value to zero at time $t_2$, the counter output switches to a low state, in turn opening the switch Q1. An interrupt is again generated to cause loading of a new value into the latch 96 and decrementing of the next duration by the counter 90.

The above process continues until the (P+1)/2th pulse is generated, following which the data representing the first quadrant of the PWM output (except the value relative to the (P+1)/2th pulse) is loaded in reverse sequence in the PTM 76. The counter and latches are operated as noted before to produce the proper pulse widths.

Of course, values representing the deviation between switching points for an entire half-cycle can be stored in the RAM 70, if desired, in which case the values would be loaded into the latches in proper sequence to produce the required pattern.

As seen in FIG. 4, the switch control signal for the switch Q1 is inverted by an inverter 130 in a switch control circuit 131A and the resulting signal is coupled to one input of an AND gate 132. A second input of the AND gate 132 receives a signal from a half-wave rectifier 134 coupled to $V_{PORA}$ and a pulse shaper 135. The circuits 134, 135 together generate a signal which is in a high state for the first half-cycle of the voltage $V_{PORA}$ and in a low state for the balance of the cycle. The AND gate 132 combines the signals at the first and second inputs to generate a switch control signal for the switch Q7, FIG. 3, so that the phase output $V_A$ is clamped by Q7 to the neutral voltage during off periods of the switch Q1 in the first half-cycle of the phase output. This action limits the swing in output voltage, as previously mentioned.

During the first 180° of the output waveform, the switches Q2 and Q8 are maintained in an off state. At some point prior to the 180° point, the appropriate latch in the PTM 78 is loaded with the information representing the duration between the 180° point and the first switching point of the PWM waveform for this half cycle. The operation of the latch and counter in the PTM 78 to control the switch Q2 is identical to that described with reference to the PTM 76 and the switch Q1, the only difference being the timing of enable signals for the counters in the PTM 78.

The switch Q8 is controlled by signals which are generated by a switch control circuit 136A comprising inverters 137, 138 which receive the output of the pulse shaper 135 and the switch control signals for the switch Q2, respectively, and an AND gate 140 which combines the inverter outputs to produce the control signal shown in FIG. 3. The switch Q8 is thereby controlled to clamp the phase output $V_A$ to neutral during the second 180° of each cycle during off periods of the switch Q2.

The net effect of the above operation is to produce the waveform $V_{AN}$ illustrated in FIG. 3 representing the phase output with respect to neutral. This phase output is filtered by the output filter 36 to produce the sine wave output $V_{PORA}$ shown in dotted lines in FIG. 3.

The control of the remaining switches Q3–Q6 in the inverter is identical to that described above, it being understood that these switches are controlled in accordance with the variables F and DM so that the phase outputs $V_B$ and $V_C$ are displaced 120° with respect to one another and with respect to the phase output $V_A$. This displacement is accomplished by suitable timing of the enable signals coupled to the counters in the PTMs 76, 78.

The control of switches Q9–Q12 is accomplished by switch control circuits 131B, 131C and 136B, 136C, which are identical to the circuits 131A and 136A, with the exception that the circuits 131B and 131C are coupled to the voltages $V_{PORB}$ and $V_{PORC}$, respectively.

It should be noted that the internal timing of the CPU 68 is controlled by a high-speed clock signal of approximately 16 megahertz so that a change in the PWM pattern can be effected within a single output cycle. This response time can be minimized by use of a 16-bit microprocessor, such as a Motorola 68000. This ensures that the output is maintained within closely prescribed values with a minimum of control delay.

It should be noted that, in the event the control 12 is to be utilized with the inverter shown in FIG. 2, that the switches Q13, Q14, and Q15 would be controlled by the circuitry shown in FIG. 7. With specific reference to the control of the switch Q13, the switch control signals for the switches Q1 and Q2 are inverted by a pair of inverters 140, 142, respectively, and are coupled to an AND gate 144. The resulting signal is utilized to control the switch Q13 to cause it to conduct when both of the switches Q1 and Q2 are off.

Control of the switches Q14 and Q15 is similar to that described with respect to switch Q13, with the switch control signals for the switches Q1 and Q2 being replaced by those for the switches Q3 and Q4 or the switches Q5 and Q6, respectively.

As previously noted, each phase output may be individually controlled, i.e. the PWM pattern for each phase may be calculated according to the variable DM as derived for each phase. In practice, this generally may result in different PWM patterns for each phase in the presence of an unbalanced load condition.

The current error signal shown in FIG. 4 may be utilized to disable the counters in the PTM's 76, 78 to deactivate the inverter, in the event of a shoot-through or a cross conduction condition.

When the inverter is to be utilized as a constant frequency power supply, the frequency command shown in FIG. 4 may be dispensed with, as would be the blocks 110 and 112 shown in FIG. 6. In this case, the only variable in the equations (1)–(5) solved by the microcomputer 66 is the variable DM, thereby further simplifying the task of producing the necessary required PWM waveforms.

The above control is capable of reducing harmonic content in the output so that the first harmonic of significance is the seventeenth harmonic. While this criteria is exceeded by some inverter controls, and hence the instant control must be utilized in conjunction with an inverter having a relatively larger output filter it is felt that other advantages far outweigh this disadvantage. Of particular significance is the fact that the instant control provides continuous regulation of output voltage or another output parameter as contrasted with the Nabae et al system in which regulation is achieved in discrete steps. This, in effect, means that the Nabae et al system may not be capable of providing the desired degree of output voltage regulation. The present invention is therefore capable of controlling an inverter to provide a quality of output power in terms of voltage regulation beyond that which can be provided by the prior art.

Of further significance is the fact that the instant control requires less memory than the Nabae et al system for a comparable degree of output regulation.

In fact, the flexibility of the instant control is illustrated by the fact the PROM 72 can be loaded with the above described constants for various values of P to enable calculation of switching points for PWM waves at varying frequencies and for variations in DM using only a modest memory. The inverter control and inverter can then be used in a wide variety of applications with a minimum of modification. For example, the same control system could be used with an inverter to operate a variable speed motor or could be used as a high quality output constant-frequency power supply, with few, if any, modifications required to convert the control from one application to the other.

Furthermore, the quality of power developed by an inverter which is operated by the instant control is improved over that disclosed in Nabae et al in terms of the harmonic content produced over the operational life of the inverter. This is due to the fact that the harmonic content of the inverter output when using the control of the present invention is relatively constant and is known in advance and hence the output filter can be sized accordingly. This is contrasted with the variable harmonic content produced by inverters controlled in accordance with the Nabae et al. logic, which requires that the output filter be sized for worst-case operation. While the Nabae et al output filter can be made smaller for a comparable application, the harmonic content of the output, taken over the operating time of the inverter, is believed to be greater than that produced by the control of the instant invention.

It should be noted that the control of the present invention can be utilized to reduce the DC content in the inverter output. In this case, a phase voltage at the point of regulation is coupled to separate positive and negative half-wave rectifiers so that DC signals representing the positive and negative portions of the wave are produced. The DC signals are individually compared to reference signals and the resulting signals are utilized to calculate first and second required PWM patterns to minimize the variation in the positive and the negative cycles from the reference signals. The results of these calculations may then be averaged to bring the positive and negative portions of the wave into balance and thereby minimize the DC content.

Of course, the DC content in the output of the inverter can be sensed in other ways. Also, the result of these calculations can be combined in another way to reduce DC content, if desired.

The above scheme can therefore take into account DC levels in the output generated by mismatch in component values or other factors.

We claim:

1. A control circuit for on-line control of a neutral-clamped PWM inverter having a pair of switches connected in series across a DC power source which are operated to produce an output at a junction therebetween, the junction being connected to a neutral voltage by a third switch, comprising:

means for generating a depth of modulation signal representing the deviation of the output from a desired level;

a microprocessor for calculating switching points for the inverter switches during operation of the inverter based upon the depth of modulation signal for a given number of pulses to be produced during each half-cycle of the output, the microprocessor including a CPU for calculating the result:

$$\alpha_{RN} = \frac{90}{FP}(2N-1) - \frac{180}{\pi F} DM \int_{\frac{90}{P}(2N-2)}^{\frac{90}{P}(2N-1)} \sin\theta d\theta$$

$$\alpha_{FN} = \frac{90}{FP}(2N-1) + \frac{180}{\pi F} DM \int_{\frac{90}{P}(2N-1)}^{\frac{90}{P}(2N)} \sin\theta d\theta$$

where $\alpha_{RN}$ is the rising edge of a pulse N in a switch control signal, $\alpha_{FN}$ is the falling edge of a pulse N in the switch control signal, F is the desired frequency of the inverter output, P is the number of pulses to be produced in a half-cycle of the inverter output and DM is the depth of modulation; and means coupled to the microprocessor for developing switch control signals for each switch from the switching points so that the switches are operated to reduce the deviation of the output from the desired level.

2. A control circuit for on-line control of a neutral-clamped PWM inverter having a pair of switches connected in series across a DC power source which are operated to produce an output at a junction therebetween, the junction being connected to a neutral voltage by a third switch, comprising:

means for generating a depth of modulation signal representing the deviation of the output from a desired level;

a microprocessor for calculating switching points for the inverter switches during operation of the inverter based upon the depth of modulation signal for a given number of pulses to be produced during each half-cycle of the output, the microprocessor including a CPU for calculating the result:

$$\alpha_{RN} = \frac{90}{FP}(2N-1) - \frac{180}{\pi F} DM \int_{\frac{90}{P}(2N-2)}^{\frac{90}{P}(2N-1)} \sin\theta d\theta$$

$$\alpha_{FN} = \frac{90}{FP}(2N-1) + \frac{180}{\pi F} DM \int_{\frac{90}{P}(2N-1)}^{\frac{90}{P}(2N)} \sin\theta d\theta$$

where $\alpha_{RN}$ is the rising edge of a pulse N in a switch control signal, $\alpha_{FN}$ is the falling edge of a pulse N in the switch control signal, F is the desired frequency of the inverter output, P is the number of pulses to be produced in a half-cycle of the inverter output and DM is the depth of modulation;

means coupled to the microprocessor for storing values representing the duration between switching points; and means coupled to the storing means for counting the values in a predetermined sequence to produce switch control signals for each switch from the switching points so that the switches are operated to reduce the deviation of the output from the desired level.

3. A control circuit for on-line control of a neutral-clamped PWM inverter having a pair of switches connected in series across a DC power source which are operated to produce an output at a junction therebetween, the junction being connected to a neutral voltage by a third switch, comprising:

means for generating an error signal DM representing the deviation of the output from a desired level;
means coupled to the generating means for calculating switching point values $\alpha_{RN}$, $\alpha_{FN}$ as follows:

$$\alpha_{RN} = \frac{90}{FP}(2N-1) - \frac{180}{\pi F} DM \int_{\frac{90}{P}(2N-2)}^{\frac{90}{P}(2N-1)} \sin\theta\, d\theta$$

$$\alpha_{FN} = \frac{90}{FP}(2N-1) + \frac{180}{\pi F} DM \int_{\frac{90}{P}(2N-1)}^{\frac{90}{P}(2N)} \sin\theta\, d\theta$$

where $\alpha_{RN}$ is the rising edge of a pulse N in a switch control signal, $\alpha_{FN}$ is the falling edge of a pulse N in the switch control signal, F is the desired frequency of the inverter output and P is the number of pulses to be produced in a half-cycle of the inverter output;

means coupled to the calculating means for developing switch control signals for each switch from the values of $\alpha_{RN}$ and $\alpha_{FN}$ so that the switches are controlled to reduce the deviation of the output from the desired level.

4. The control circuit of claim 3, further including means for storing a value representing the duration between switching point values $\alpha_{RN}$ and $\alpha_{FN}$.

5. The control circuit of claim 4, wherein the developing means includes a counter for counting the stored value to develop the switch control signals.

6. The control circuit of claim 5, wherein the developing means further includes a latch coupled between the calculating means and the counter.

7. The control circuit of claim 3, wherein the calculating means comprises a microprocessor.

8. The control circuit of claim 3, wherein the calculating means includes means for storing the duration between switching points of (P+1)/2 pulses.

9. A method of controlling a neutral-clamped PWM inverter having a pair of switches connected in series across a DC power source wherein the switches are operated to produce an output at a junction therebetween, the junction being connected to a neutral voltage by a third switch, the method comprising the steps of:

generating a depth of modulation signal representing the deviation of the output from a desired level;
calculating switching points for the inverter switches during operation of the inverter following start-up thereof based upon the depth of modulation signal for a given number of pulses to be produced during each half-cycle of the output, such calculation being accomplished without the use of stored PWM patterns; and
developing switch control signals for each switch from the switching points so that the switches are operated to reduce the deviation of the output from the desired level.

10. The method of claim 9, wherein the step of calculating includes the step of storing values representing the duration between switching points 11. The method of claim 10, wherein the step of developing includes the step of counting the stored values to develop the switch control signals.

12. The method of claim 11, wherein the step of developing includes the step of latching the stored values before such values are counted.

13. The method of claim 9, including the step of rectifying the inverter output to derive a signal representing the output voltage.

14. The method of claim 13, wherein the step of generating includes the step of subtracting a reference signal from the rectified signal to generate the depth of modulation signal.

15. The method of claim 9, further including the step of utilizing a microprocessor to calculate the switching points.

16. The method of claim 10, wherein the step of developing includes the step of counting the values in a predetermined sequence to produce the switch control signals for each switch.

* * * * *